United States Patent [19]
Boehme et al.

[11] 3,945,279
[45] Mar. 23, 1976

[54] PROCESS AND APPARATUS FOR AUTOMATICALLY CUTTING OUT WORK PIECES IN ACCORDANCE WITH A PATTERN

[75] Inventors: Dietrich Boehme, Kahl; Günter Hahn, Hausen; Gunter Schumann, Ober Roden, Messenhausen; Walter Wienen, Fellbach; Rolf Jung, Waiblingen, all of Germany

[73] Assignees: Messer Griesheim GmbH, Frankfurt am Main; Krauss und Reichert, Fellbach, Stuttgart, both of Germany

[22] Filed: May 7, 1974

[21] Appl. No.: 467,624

[30] Foreign Application Priority Data
May 18, 1973 Germany............................ 2325289
Sept. 29, 1973 Germany............................ 2349073

[52] U.S. Cl. ........................ 83/34; 83/49; 83/364; 83/365; 83/368; 83/925 CC
[51] Int. Cl.² ........................................ D06H 7/00
[58] Field of Search ....... 83/925 CC, 565, 365, 371, 83/364, 34, 49, 368

[56] References Cited
UNITED STATES PATENTS

| | | |
|---|---|---|
| 1,923,208 | 8/1933 | Howey ............................ 83/565 X |
| 3,245,295 | 4/1966 | Mueller ................. 83/925 CC UX |
| 3,800,650 | 4/1974 | Schroder........................... 83/565 X |
| 3,838,618 | 10/1974 | Eissfeldt et al. ............. 83/925 CC X |

*Primary Examiner*—Frank T. Yost
*Attorney, Agent, or Firm*—Connolly and Hutz

[57] ABSTRACT

Retarding markings are provided alongside a linear pattern to be cut out by an automatic device guided by a photoelectric scanner. The markings are disposed a short distance ahead of the changes in direction of the pattern line, which is greater than the resultant decelerating path of the advance motors from the original faster advance speed to the resultant slower advance speed. A timing circuit initiates the change in advance speed after the retarding mark is detected and a second timing circuit changes the overhang of the line-scanning photocells from an initial greater magnitude to the lesser required magnitude correspond to the slower advance speed. Acceleration marks may also be provided after directional changes in the pattern to accelerate the advance speed back to the original advance speed after the changes in directions are accomplished. A third timing circuit is then provided to subsequently increase the advance speed and overhang of the photoelectric cells ahead of the axis of rotation of the scanning head back to their original magnitude.

17 Claims, 4 Drawing Figures

PROCESS AND APPARATUS FOR AUTOMATICALLY CUTTING OUT WORK PIECES IN ACCORDANCE WITH A PATTERN

BACKGROUND OF THE INVENTION

This invention relates to a process and an apparatus for automatically cutting out work pieces in accordance with a pattern, which contains the cutting information in the form of a line to be scanned by means of a photoelectric scanner.

The invention furthermore relates to a process for automatically cutting out materials or the like in accordance with a patterned template, which contains the cutting information in the form of a single, continuous, uncrossable line to be scanned by means of a scanner, and wherein, with a specified directional change of the line, a deceleration of the scanning and cutting procedure is brought about.

A process for the automatic cutting, wherein the work pieces are textile fabrics, is already known from the German DAS 1,460,140, the procedure being conducted with a drawing pattern (template) wherein the areas to be cut out are darker than the remaining areas, so that the scanning of the lines containing the cutting information occurs in accordance with the so-called border-scanning process.

In this known process, a scanning member in the form of a single photoelectric cell is arranged in the scanning direction ahead of the rotational axis of the scanning device and overhangs the junctions of the inside corners of the cutting pattern template, so that it precedes the arrival over the dark area of the cutting pattern template. The change in the output signal of the scanning member causes a delayed stopping of the scanning device, and indeed in such a manner that its rotational axis arrives at a standstill over the junction at the inside corner, whereupon a rotational movement of the scanning device is then begun, which is continued until the scanning meember is again situated over the edge to be scanned, whereupon the scanning device again takes up its movement along the edge to be scanned.

Such known process is limited in its possibilities of application, because on the one hand it may only be used in border scanning, while in many present instances, line scanning is employed, which in many respect is more advantageous. On the other hand, it enables the determination of only sharp edges of the border to be scanned, while the sharp curves (where a deceleration of the scanning and cutting process would equally be desirable), it cannot accomplish such a deceleration. In addition, such known process has problems with high cutting speeds, because the distance between the scanning member and the rotational axis of the scanning device — subsequently designated as overhang — is definitely specified, so that only a relatively short stretch is available for the deceleration to a standstill. Finally, such known process offers no possibility of effecting a deceleration of the scanning and cutting processes which does not lead to a complete standstill of the scanning and cutting devices.

In addition, the German DAS 1,147,664 discloses a device for photoelectrically scanning of lines of a drawing pattern wherein the offset is variable. In this connection, in the setting of a certain advance speed, the overhang is also adjusted, and in particular in such a manner that with a fast advance speed, a greater overhang exists, and with slower advance speed, a lesser overhang exists. However, with such known devices, it is not possible to automatically decelerate the advance speeds, (and consequently the scanning and cutting process) in sharp corners or in narrow curves in the line to be scanned and to accelerate the advance speed again to the initially set factor upon passing the curve.

Furthermore, German Pat. No. 1,563,556 discloses an electrical copying control device for finishing machines, wherein a mechanism is provided for correcting the advance speed depending on the degree of deflection of the curved line, which is affected by the output signal of the photoconductive cell scanning the line, the correctional signal being added to the output signal of the electrical scanner.

A combination of the device of the German DAS 1,147,664 with the electrical copying control device disclosed in German Pat. No. 1,563,556 theoretically leads to an arrangement wherein the overhang and the advance speed are variable depending on the degree of curvature of the line. However, in practice it has been shown that such an arrangement is unsuitable for reproducing smaller radii curves or sharp-edged corners by a curved line. This is particularly affected by the fact that the overhang is reduced simultaneously with a controlled deceleration of the advance speed from a maximum magnitude (e.g. 6 m/min.) to a relatively low magnitude for rounding the curve (e.g. 0.5 m/min.). The overhang reduction, however, occurs in a much shorter time than the controlled reduction of the advance speed, because in decelerating the advance speed, the mass of the entire cutting machine as well as the deceleration time of the advance motors must be taken into account in the control process. The result is that the smallest overhang is already obtained while the advance speed is still of relatively high magnitude (e.g. 3 m/min.). This makes the scanning system become unstable and it begins to oscillate and cannot provide optimum scanning efficiency. The smaller the radius of the curve to be rounded, the greater are the problems. Even a delayed variation of the overhang does not eliminate this disadvantage because as a result of the relatively great stopping distance (with 6 m/min. advance speed there is about a 20 mm stopping distance), the scanning head would already have passed over the line to be scanned.

With curve radii smaller than 10 mm, such system is completely unstable.

Particularly in the cutting of textiles by means of a cutting knife, laser beam or the like, as well as in the plasma and laser cutting of metal work pieces, synthetic substances and the like, it is necessary, however, to scan and reproduce very small curve radii, e.g. 2 to 4 mm, as well as sharp-edged corners.

The object of the invention is to avoid the abovementioned disadvantages and to provide a flexible control of the speed in scanning the line containing the cutting information or in automatic cutting, by means of which even the smallest curves may be reproduced.

SUMMARY

Such object is solved in accordance with the invention by a process of the initially described type, which is characterized in that in the traveling direction of the scanning device, there are provided retarding markings at a specified distance before points at which a direction change of the line occurs which is greater or equal to a predetermined magnitude of the directional change, the markings being detected and utilized for the actuation of a predetermined deceleration of the scanning and cutting procedure. The retarding markings are preferably arranged, in this connection, at a distance from the directional change points which is somewhat greater than the path (e.g. 18 mm) which is traveled by the advance motors in the arresting period from a specified advance speed (e.g. 6 m/min.) to a reduced advance speed (e.g. 0.5 m/min.). By means of the retarding markings, a control impulse is generated which changes the advance speed to a reduced advance speed for rounding the curve. Simultaneously, a timing circuit is started, which (once the reduced advance speed is obtained) changes the overhang from a greater to the required lesser magnitude. Such novel procedures provides in each case a reduced advance speed prior to reaching the curve to be traversed, and only then does an overhang adjustment occur. By means of the markings, the arresting time of the motors is taken into consideration at the beginning of the retarding procedure and no longer exerts any influence during the retarding process. This invention makes it possible to round the smallest curves and sharpest corners and the scanning system remains stable during the entire scanning process.

As an advantageous further development of the invention, it is proposed to provide (after the points at which a directional change of the line has occured), acceleration markings which are detectable in the scanning process and may be utilized for the triggering of a predetermined acceleration of the scanning and cutting process. By means of these markings it is advantageously achieved that after rounding the curve, the overhang and advance speeds are again changed back to the original magnitude. Preferably, the acceleration markings are arranged directly (several mm) past the curves.

It has been found particularly suitable if the retarding or accelerating markings are provided at a predetermined lateral spacing from the line and preferably have a length which is greater than the width of the line to be scanned.

The advantage is thereby achieved that a signal is given for the retardation or acceleration only when the entire length of the marking has been scanned. Consequently, it is possible to also scan lines crossing each other at right angles.

For carrying out the novel process, furthermore, an apparatus has been demonstrated to be particularly well suited, which is characterized in that the scanning device has at least one additional scanning member for detecting the retarding and accelerating markings as well as control devices, which (upon the detection of one of the markings by the additional scanning member) initiate a deceleration or acceleration of the scanning and cutting process. The scanning device preferably has a scanning head, rotatable about a pivoted axis, wherein, (preferably viewed in the scanning direction), two differential pairs of photoelectric cells are arranged one after the other and displaced ahead of the axis of rotation, and furthermore wherein, preferably next to the pairs of photoconductive cells or photoresistors of the first differential pair of photoelectric cells, at least one signal photoconductive cell is provided for the detection of markings.

A particularly advantageous control device is provided by a first timing circuit which switches the advance motors to a reduced advance speed, and furthermore by a second timing circuit which switches the overhang to a lesser magnitude after the speed of the advance motors are reduced.

If acceleration markings are also provided, it is advantageous to provide a third timing circuit for switching the advance speed and overhang from the reduced magnitude back to the original larger magnitude. The timing circuits are advantageously constructed in this connection as monostable multivibrators.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
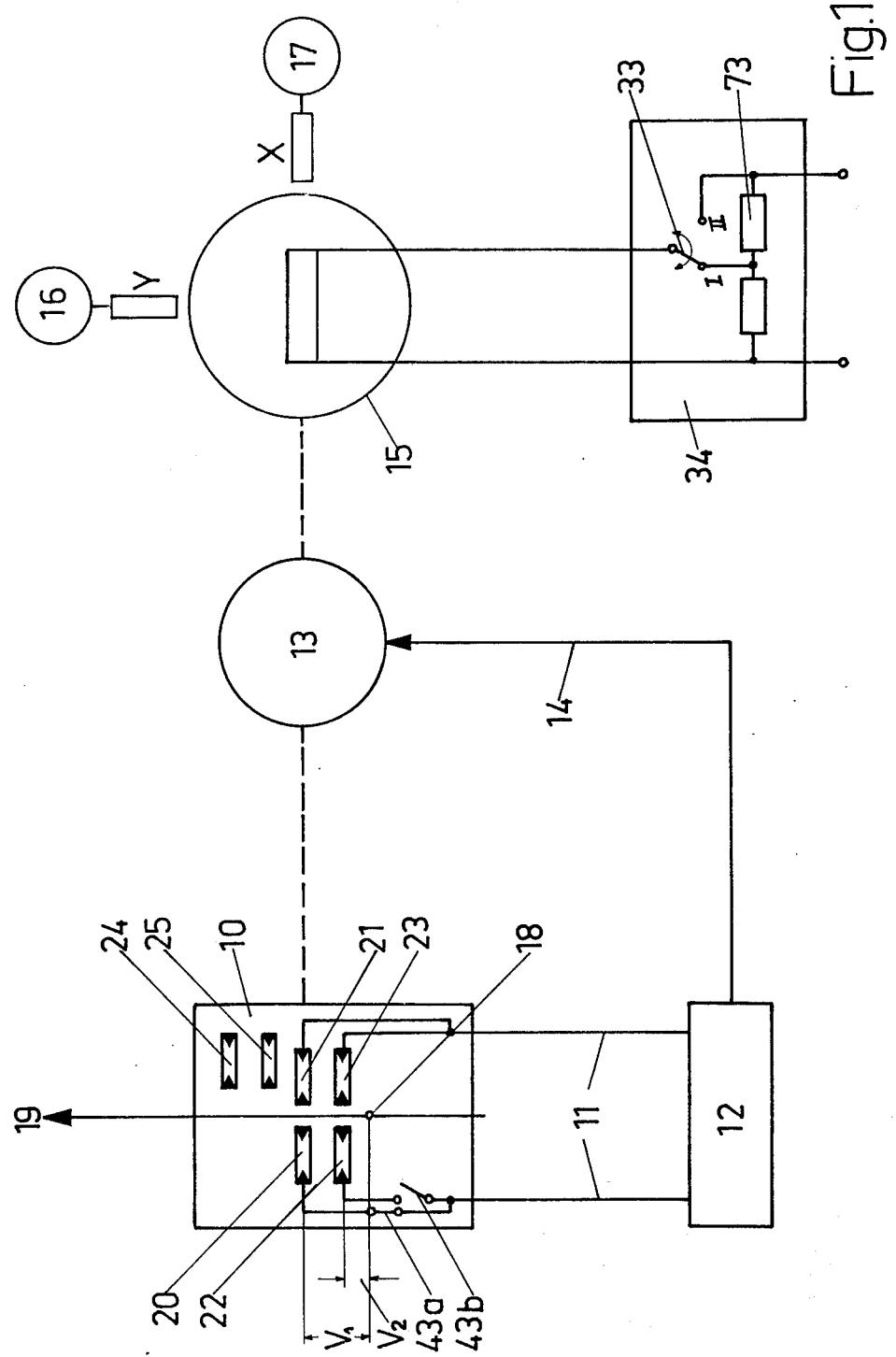
FIG. 1 is a block schematic diagram of a portion of a photoelectric copying control apparatus which is one embodiment of this invention.

In FIG. 1, is shown a photoelectric scanning head 10 for emitting control signals, which characterize the relative position of scanning head 10 in relation to the line to be scanned (shown in FIG. 4) and which is connected by means of leads 11 to an amplifier stage 12. The structural assembly of scanning head 10 is not illustrated in detail because it is not essential for this present invention.

Scanning head 10 is mechanically coupled, for example, in a known manner with a follower motor 13, which rotates scanning head 10 and the particular tool connected thereto (cutting knife for soft material, laser, plasma or autogenous cutting torch or the like) in accordance with the supplied control signals, which are conducted to motor 13 from amplifier 12 by means of leads 14 in accordance with the changing direction of tangents to the curved line being scanned. Follower motor 13 is furthermore mechanically connected with a function generator (resolver) 15, which effects a resolution of the adjusting motion of motor 13 into X and Y components. The two X and Y coordinate motors (advance motors) 16 or 17 are controlled by the output signals of resolver 15.

Scanning head 10 swivels about axis 18, and viewed in the forward direction of scanning 19, has two differential pairs of photoelectric cells or photoresistors 20, 21 and 22, 23 disposed one after the other, ahead of swivel axis 18. The distance between differential cells 20 and 21 and between differential cells 22 and 23 is less than the width of the line of the drawing pattern to be scanned, as shown in FIG. 4. The signal photoresistor 24 or signal photoresistors 24 and 25 are connected with control devices, which are illustrated in more detail in FIGS. 2 and 3.

Figure 2:
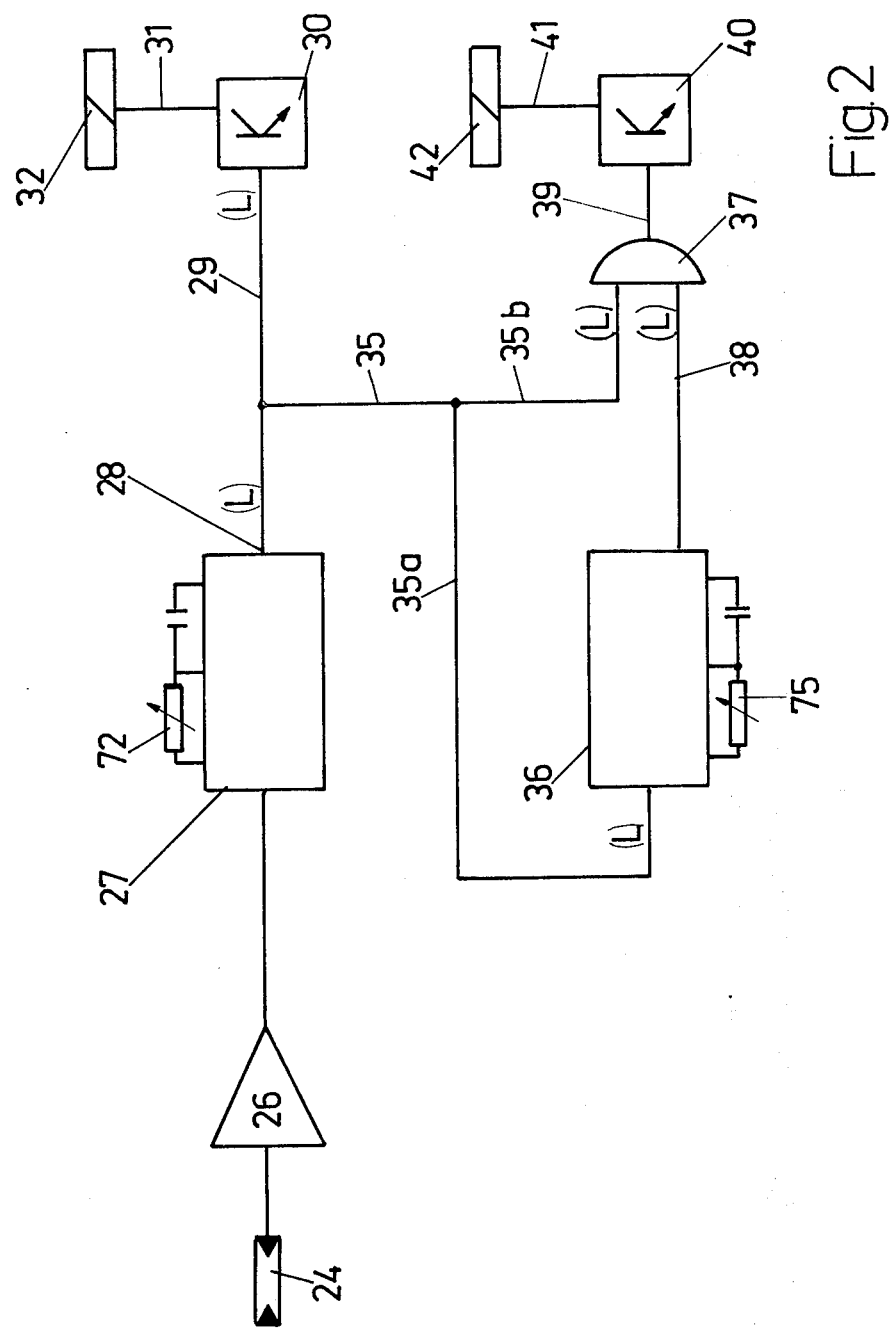
FIG. 2 is a block schematic diagram of another embodiment of a control apparatus for performing the novel process of this invention.

The control device of FIG. 2 includes an amplifier 26, connected with the signal or photoresistor 24. A first timing circuit componenet or monostable multivibrator 27 is connected to the amplifier. Output 28 of multivibrator 27 is connected by means of lead 29 with switching transistor 30, which is operatively connected to relay coil 32 whose switching contact 33 is situated in the power supply 34 for resolver 15 as illustrated in FIG. 1 and provides rapid switching. Furthermore, output 28, of M.V. 27 is connected by means of a branched lead 35 with a second timing circuit component (monostable multivibrator) 36 (lead 35a) as well as with AND gate 37 (lead 35b). The AND gate 37 is furthermore connected by means of lead 38 with the Not-output 39 of multivibrator 36. To the AND gate 37 is connected a switching transistor 40 whose collector lead 41 is located a relay coil 42 which actuates the switching contacts 43a and 43b which provide the switching action from the first differential pair of photoelectric cells to the second (see FIG. 1).

Figure 3:
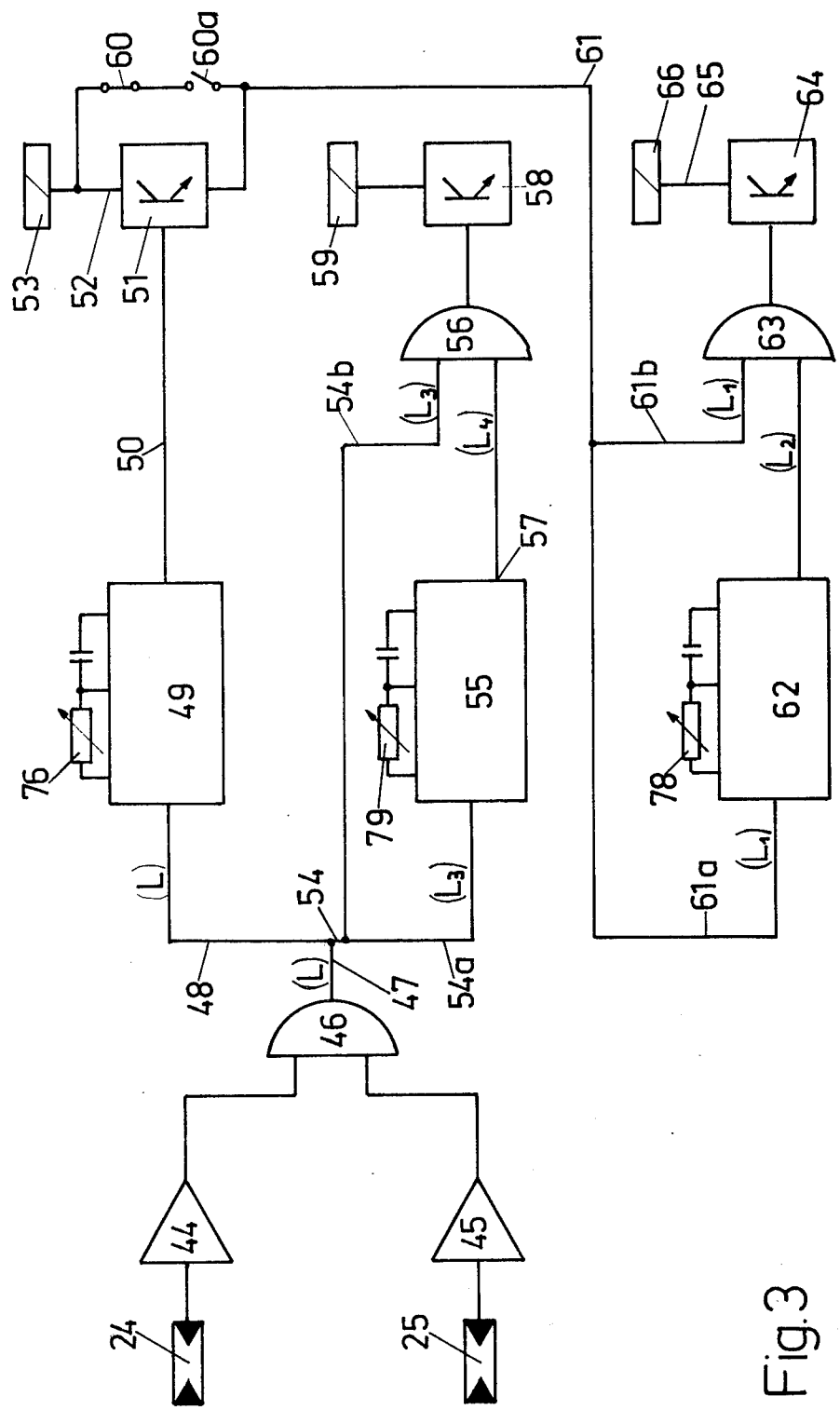
FIG. 3 is a block schematic diagram of another embodiment of this invention.
Figure 4:
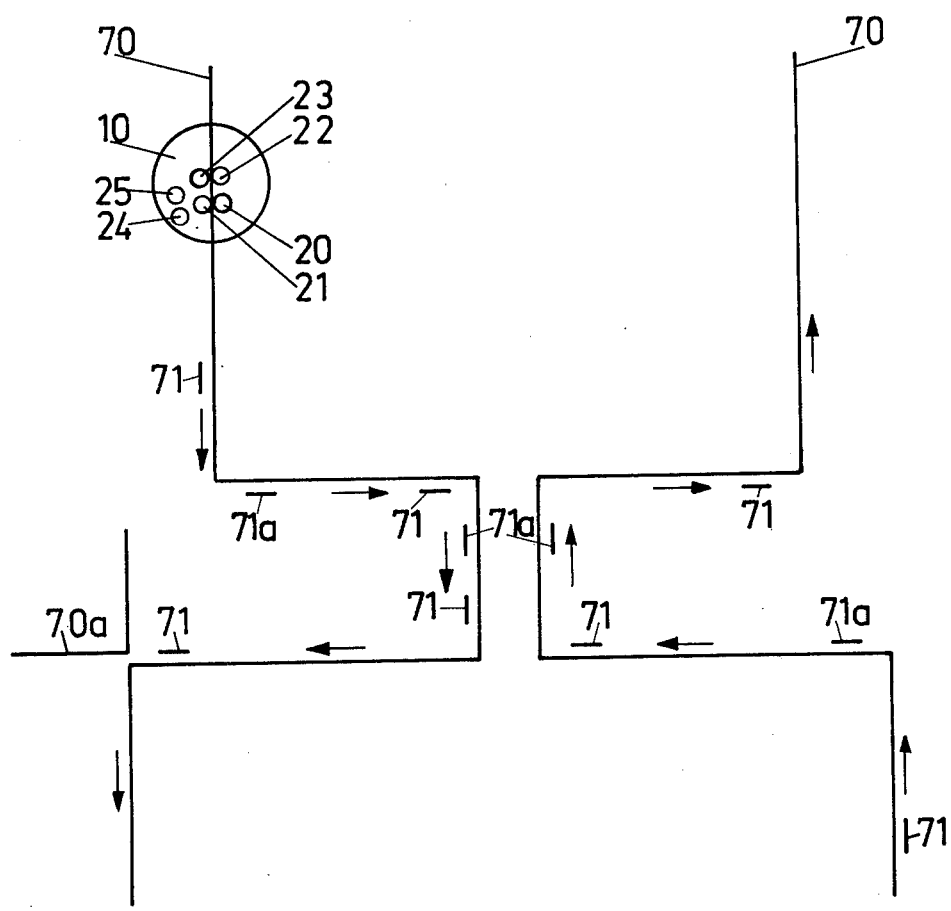
FIG. 4 is a top plan schematic diagram of the scanning head in accordance with the invention traversing a linear pattern applied in accordance with this invention.

The control device of FIG. 3 consists of amplifiers 44 and 45, respectively connected to signal photoconductive cells or photoresistors 24 and 25. The outputs of amplifiers 44 and 45 being connected with a first AND gate 46. Output 47 of AND gate 46 is connected by means of lead 48 with a first timing component (monostable multivibrator) 49, whose output 50 is connected with a switching transistor 51 with relay coil 53 arranged in the collector circuit 52. Coil 53 is provided for the switching contact, designated in FIG. 1 as 33.

Furthermore, output 47 of the first AND member 46 is connected by means of a branched lead 54 with a third timing circuit component (monostable multivibrator) 55 (lead 54a) and with a second AND gate 56 (lead 54b).

The second input of the AND gate 56 is in contact with the Not-output 57 of multivibrator 55. To the AND gate 56 is connected a switching transistor 58, whose relay coil 59 actuates switching contact 60, arranged parallel to the first switching transistor 51.

Connected to the collector circuit 52 of the first switching transistor 51 is a branched lead 61, which on the one hand is in contact with a second timing circuit component (monostable multivibrator) 62 (lead 61a) and on the other hand with a third AND gate 63 (lead 61b). The other input of the AND gate 63 is in contact with the Not-output of multivibrator 62.

To the AND gate 63 is connected switching transistor 64 in whose collector circuit 65 is included coil 66, which actuates the switching contacts 43a and 43b (FIG. 1).

The manner of operation of the above-described devices (according to FIGS. 2 and 3) is explained in FIG. 4, wherein is illustrated a partially shown drawing pattern, for example, a template.

The line to be scanned or the two line segments to be scanned are designated in FIG. 4 by 70. In FIG. 4, furthermore, there is indicated the scanning head 10 of the scanning device, containing the differential pairs of photoelectric cells 20, 21 and 22, 23 as well as an additional scanning member in the form of the signal photoconductive cells or photoresistors 24, 25. When differential photoconductive cells or photoresistors 20, 21, 22, 23 closely abut line 70 or partially cover it, the signal photoconductive cells or photoresistor 24 or 25 is a predetermined distance away from line 70, such as, for example, a distance of about 2 to 4 mm. At the same lateral distance from line 70, delay markings 71 are provided according to the invention. The delay markings 71 are situated in the direction of movement of the scanning device, indicated by the arrows alongside line 70, at predetermined distance ahead of points at which a directional change of a predetermined magnitude of line 70 is achieved. In the example shown, these points are all constituted by the junctions of right-angled corners, and the distance of the delay markings 71 from these corners is about 20 mm.

In using the exemplary embodiment illustrated in FIG. 2 for detecting a delay marking 71 by the signal photoconductive cell 24, a signal is produced which actuates the multivibrator 27, so that it emits a signal L for a time $t_1$ adjustable by changing the setting of variable resistor 72. Signal L energizes transistor switch 30, whereby coil 32 is energized and contact 33 (FIG. 1) is switched into Position I. Thus, resistor 73 is switched into the resolver supply circuit, the resolver supply voltage becomes lower and consequently the advance speed of the motors is reduced. The extent of the speed reduction is adjustable by varying the value of resistor 73.

Simultaneously, as shown in FIG. 2, Signal L is conducted by means of lead 35a to the second monostable multivibrator 36, which after a time $t_2$, adjustable by means of variable resistor 75, becomes nonconductive and then emits a Signal $L_1$. Time $t_2$ is adjusted so that Signal $L_1$ results only when the advance speed has been reduced the predetermined amount. Signals L and $L_1$ are conducted to the AND gate 37 to open it and energize switching transistor 40. This energizes coil 42 and opens contact 43a (FIG. 1) and closes contact 43b. Consequently, thereafter it is no longer the first differential pair of photoelectric cells 20, 21 with the greater frontal overhang $V_1$ relative to axis of rotation 18 (about 6 mm) which determines the scanning of line 70 but instead the second pair of differential photoelectric cells 22, 23 with their smaller frontal overhang $V_2$ (about 0.5 mm).

The corner is now rounded with reduced speed and smaller control differential. Upon the expiration of time $t_1$, which is predetermined in such a way that it insures that the scanning head rounds the corner with reduced magnitude control factors, Signal L becomes zero. Thereby both switching transistors 30 and 40 are closed and contact 33 is switched to Position II, contact 43a is closed and contact 43b is opened. The originally high advance speed as well as the greater scanning overhang become effective again.

In the exemplary embodiment of FIG. 3, the delay markings 71, arranged alongside line 70, are picked up simultaneously by both of signal photoresistors 24 and 25, and a Signal L is conducted by means of the first AND gate 46 to the first monostable multivibrator 49. In this connection it is preferred to have the length of the delay markings 71 greater than the thickness of line 70. The advantage in this is that line segments 70, crossing at right angles, may be traversed. Furthermore, it is advantageous that because of the two signal photoresistors 24, 25 and of AND gate 46, no signal is then emitted if only one of the signal photoresistors is influenced, e.g. by a second line 70a situated near line 70.

The AND gate 46 controls multivibrator 49, so that it emits a signal L for a time $t_1$ (10 millisec.), adjustable by means of resistor 76. Signal L actuates switching transistor 51, whereby coil 53 is energized and is held energized (by way of contact 60 and contact 60a, which are closed by coil 53), and contact 33 (FIG. 1) is switched into Position I. The advance speed is thereby reduced, as accomplished in the exemplary embodiment of FIG. 2.

At the same time, a Signal $L_1$ is conducted from collector circuit 52 of transistor switch 51 by means of lead 61a to the monostable multivibrator 62, which becomes nonconductive after a time $t_2$ set by variable resistor 78 and then emits a Signal $L_2$ at the Not-output. Time $t_2$ is set in such a way that Signal $L_2$ results only when the advance speed has the predetermined reduced value. Signals $L_1$ and $L_2$ are conducted to the AND gate 63 to energize switching transistor 64. Coil 66 is thereby energized, contact 43a (FIG. 1) is opened, contact 43b is closed, and thus the operative photoelectric cell scanning is switched to the smaller overhang. The corner is now rounded at a reduced speed and smaller overhang in front of the axis of rotation. Upon reaching the acceleration marking 71a, a Signal $L_3$ is conducted to the second monostable multivibrator 55 by means of AND gate 46, and simultaneously this signal is directed to one input of a second AND gate 56. After a time $t_3$ set by resistor 79, multivibrator 55 becomes nonconductive and emits a Signal $L_4$. In this connection, time $t_3$ is set in such a way that it is shorter than the time in which a Signal $L_3$ is produced on the basis of a specified length of the acceleration marking 71a. By means of Signals $L_3$ and $L_4$, the second AND gate 56 becomes conductive, the switching transistor 58 becomes energized, coil 59 is energized and contact 60 is opened.

Signal $L_1$ thereby becomes zero, contact 43a (FIG. 1) is closed by the deenergized relay coil 66 and contact 43b opens to switch the differential photocell overhang to the greater distance. Furthermore, the holding of relay coil 53 is released, contact 33 (FIG. 1) is switched into Position II by the deenergized coil 53, and the speed is again increased. In this connection, in order to assure the flawless functioning of the control circuit shown in FIG. 3, the length of the acceleration marking is greater than the length of the retarding marking.

In the exemplary embodiments shown, such a deceleration of the scanning and cutting processes should be brought about upon the detection of a delay marking 71 by the signal photoresistor 24 or 25, that a minimum speed should be provided at the junction of the right-angled corners, and in a particular case, the scanning and cutting device should be even briefly brought to a standstill.

It is also easily possible to provide retarding markings along line 70 of the template also at such places which are situated at a specified distance from a sharp curve of line 70, which is then scanned and traversed with correspondingly reduced speed.

In the exemplary embodiments according to FIGS. 2 and 3, the output signal of the signal photoresistor 24 or 25 is conducted upon the traversal of a retarding marking 71 to a timing circuit, which immediately or with a certain delay, initiates a deceleration of the scanning and the cutting process and, which at a specified time after the initiation of the deceleration, again switches back to the normal speed. If necessary, several timing circuits may also be provided, in which case the possibility results particularly of bringing about a gradual deceleration of the scanning and cutting process with the help of several delay markings, situated in the direction of scanning, one after the other, and then to return to the original speed again under the control of the timing circuits, gradually, if necessary. A variably timed operating sequence of the deceleration of the scanning and cutting process may further be brought about in that further scanning members are provided, which scan other delay markings provided at corresponding dispositions. It is furthermore advantageously feasible to lower or again to accelerate the advance speed by means of linear function generators in accordance with a specified function (curve).

Although the invention has been explained above in connection with the process of line scanning, it is understood that the invention may advantageously be employed also in operating in accordance with the so-called contrast process, in which a contrast scanning is carried out. In contrast scanning, the work is generally done with a template, wherein the sections to be cut out are darker than the bordering sections or in the reverse. With a respective line thickness, border scanning may also be carried out with a template which has only lines, with the scanning then occurring along the border of the line.

The possibility also exists of providing retarding marks directly on the line or edge to be scanned.

Finally, it is, of course, possible to employ electronic switching units in place of the illustrated mechanical switching units (relays).

We claim:

1. A process for controlling a cutting device which is automatically traversed by a drive mechanism controlled by a photoelectric scanning apparatus to cut a work piece in accordance with a pattern having a linear element comprising the steps of providing speed-changing marks alongside the linear element, detecting the speed-changing marks by means of the scanning apparatus, and generating a control signal in the scanning apparatus in response to its detection of a speed-changing mark whereby the speed of the drive mechanism is correspondingly changed, the scanning occurs at variable overhanging distances at the front of the photoelectric scanning apparatus, and wherein the overhanging distance is varied after the speed of the drive mechanism has been changed, whereby the overhanging distance is longer for faster speeds of drive mechanism and shorter for slower speeds of the drive mechanism.

2. A process as set forth in claim 1 wherein the speed-changing marks are disposed ahead of changes in direction of the linear element, and the control signal generated in response to its detection is a speed-retarding signal.

3. A process as set forth in claim 2 wherein speed-accelerating marks are disposed after the changes in direction of the linear element, and the control signal generated in response to the detection of a speed accelerating-mark is a speed-accelerating signal.

4. A process as set forth in claim 1 wherein the photoelectric scanning apparatus has an axis of rotation, the scanning occurs at an overhanging distance ahead of the axis of rotation, and wherein the overhanging distance is varied after the speed of the drive mechanism has been changed.

5. A process as set forth in claim 4 wherein the magnitude of the overhanging distance is changed a predetermined time after the control signal is initiated.

6. A process as set forth in claim 5 wherein the speed-changing mark is disposed ahead of a change in direction of the linear element in the path of travel of the cutting device, the control signal is a speed-retarding signal, and the overhanging distance is reduced a predetermined time after the speed-retarding control signal is generated.

7. A process as set forth in claim 6 wherein a speed-changing mark is disposed after a change in direction of the linear element in the path of travel of the cutting device, the control signal is a speed-accelerating signal, and the overhanging distance is increased a predetermined time after the speed-accelerating control signal is generated.

8. A process as set forth in claim 7 wherein the speed-retarding control signal is generated a predetermined time after the speed-retarding mark is detected, the overhanging distance reducing signal is generated a predetermined time after the speed-retarding signal is generated, and the speed-accelerating signal and overhanging distance increasing signal are generated a predetermined time after the speed-accelerating mark is detected.

9. An apparatus for controlling a device for automatically cutting out a work piece in accordance with a pattern having a linear element with speed-changing marks disposed alongside which is automatically scanned by a scanning device having photodetecting line detecting means comprising a photoelectric mark detecting element, a variable speed drive for traversing the cutting and scanning devices and an operating control device connected to the photoelectric mark detecting element and to the drive whereby the drive is caused to change its speed when a speed-changing mark is detected, the speed-changing mark is disposed ahead of a change in detection of the linear element and comprises a speed retarding mark, the photoelectric scanning device has a scanning head, first and second photoelectric detectors in the scanning head, the first photoelectric detector being disposed a predetermined overhanging distance ahead of the second photoelectric detector, the operating control system including means for alternatively activating either the first or the second photoelectric detector, and the operating control system being constructed and arranged to normally maintain the first photoelectric detector activated and to activate the second photoelectric detector and inactivate the first photoelectric detector a predetermined time after a speed retarding mark is detected.

10. An apparatus as set forth in claim 9 wherein the scanning head being rotatable about an axis of rotation, the first photoelectric detector being disposed a predetermined overhanging distance ahead of the axis of rotation, and the second photoelectric detector being disposed a shorter overhanging distance ahead of the axis of rotation.

11. An apparatus as set forth in claim 10 wherein speed-changing marks are also disposed after a change in direction of the linear element and comprise speed-accelerating marks, the operating control system is constructed and arranged to reactivate the first photoelectric detector and inactivate the second photoelectric detector a predetermined time after a speed-accelerating signal is detected.

12. An apparatus as set forth in claim 10 wherein the operating control system includes a first timing circuit for actuating the reduction in speed of the drive, and a second timing circuit for deactivating the first photoelectric detector and activating the second photoelectric detector.

13. An apparatus as set forth in claim 12 wherein the operating control system includes a third timing circuit for changing the speed of the drive back to the original speed and reactivating the first photoelectric detector a predetermined time after a speed-accelerating mark is detected.

14. An apparatus as set forth in claim 13 wherein the timing circuits are constructed and arranged as multivibrators.

15. An apparatus as set forth in claim 14 wherein the multivibrators are monostable.

16. An apparatus as set forth in claim 9 wherein the photoelectric mark detecting element is disposed a predetermined scanning distance ahead of the photodetecting line detecting means.

17. An apparatus as set forth in claim 16 wherein a pair of photoelectric mark detecting elements are provided, one of the photoelectric mark detecting elements being activated by the beginning of the mark and the other being activated by the end of the mark.

* * * * *